United States Patent Office 2,832,452
Patented Apr. 29, 1958

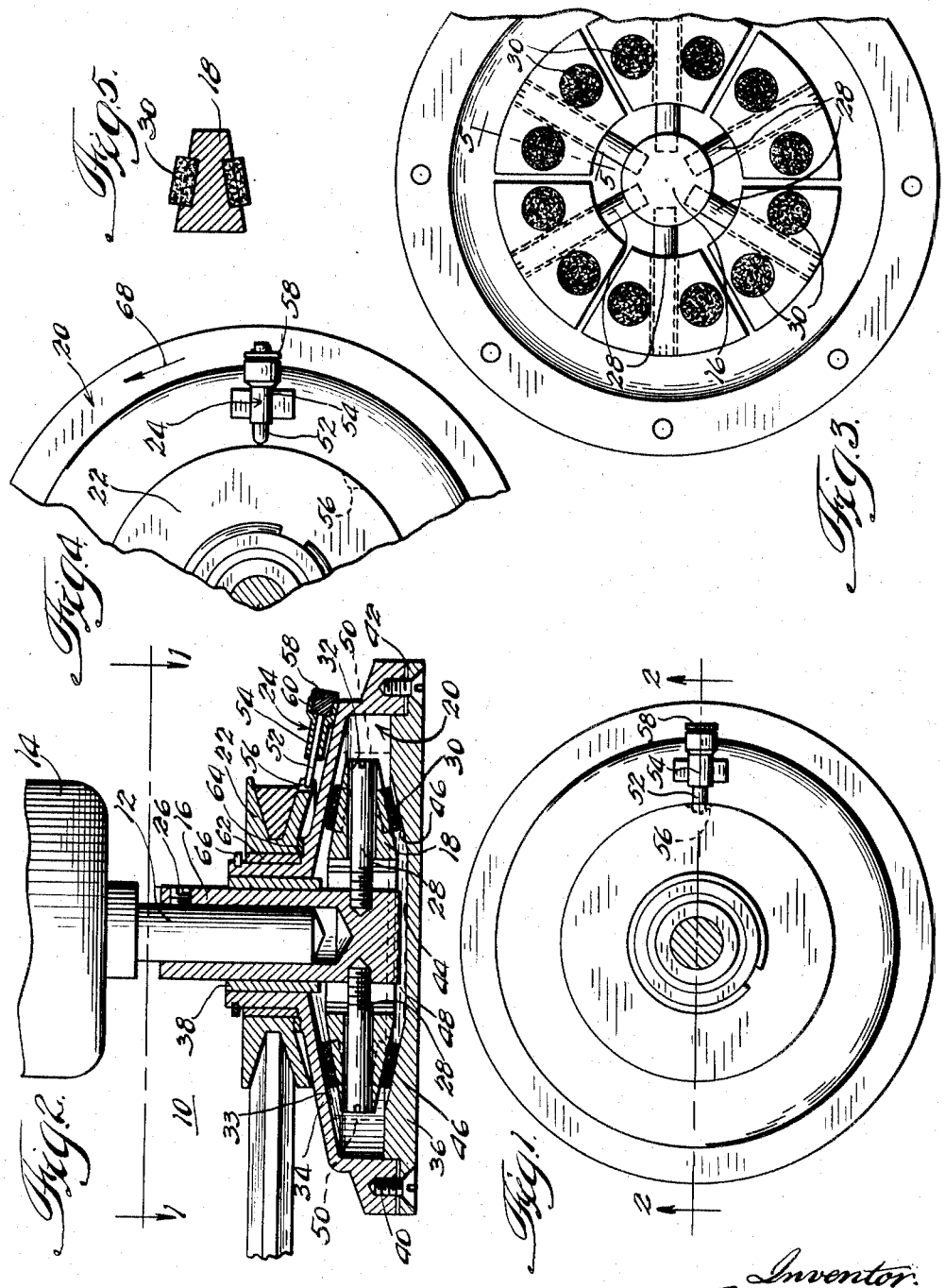

2,832,452
COUPLING APPARATUS

Charles Reykjalin, Melrose Park, Ill., assignor, by mesne assignments, to Koren Research & Engineering Company, Chicago, Ill., a corporation of Illinois Application February 12, 1954, Serial No. 409,940

7 Claims. (Cl. 192—105)

This invention relates to improved coupling apparatus and more particularly to an improved device for coupling two rotatable shafts within predetermined limits of speed and torque.

It is a principal object of this invention to provide an improved coupling device which will suffer no permanent detrimental effects from overloading.

Various devices have heretofore been proposed for coupling an input shaft to a predetermined output shaft at speeds within a predetermined range to transmit torques also limited to a predetermined range. However, when such devices have been overloaded by demanding a torque in excess of the design limits, excessive heating and consequently burned out bearings, damaged belts, severed shafts, and the like have generally been produced. To combat these damaging effects various expedients have heretofore been employed such as shear pins, overload circuit breakers and the like. However, these have generally proven unsatisfactory as they do not provide for easy reestablishment of the power coupling, do not make high starting torques available, and are not sufficiently sensitive to the torque being transmitted or the time duration of an overload.

It is therefore a further object of this invention to provide an improved coupling device which is actuated only at speeds above a predetermined minimum to provide high starting torques.

It is another object of this invention to provide an improved coupling device which will permit slippage between the driving and driven members during an initial starting period, after which the members will be firmly engaged to prevent slippage for normal torque transmission.

It is still another object of this invention to provide an improved coupling device which is speed and torque sensitive having a permanent disengaging element to prevent excessive heating of the parts for torques in excess of the designed range which persist for a substantial period of time.

It is another object of this invention to provide an improved overload protection in a coupling device by which heat is transmitted from the slipping elements to a contiguous fusible element.

It is still another object of this invention to provide a fusible element for a coupling device which is extremely simple in construction and may readily be replaced permitting easy repair and maintenance.

Further and additional objects of this invention will become obvious from a consideration of this specification, the accompanying drawings and the appended claims.

In one form of this invention an oil filled centrifugal clutch is provided wherein the input member is a rotatable shaft having a plurality of radially movable clutch elements with wedge-shaped surfaces adapted to engage correspondingly shaped surfaces in a housing comprising the output or driven member. The housing is partially filled with a lubricating fluid which will lubricate the engaging surfaces of the housing and clutch elements prior to engagement of these parts. Centrifugal force will urge the fluid to the peripheral portions of the housing, free of the engaging surfaces, when said surfaces are in driving relationship. Relative movement between the engaging surfaces will produce a wiping or wringing action which will eliminate the film of oil initially disposed therebetween and provide a more tenacious engagement.

An output sheave is rotatably mounted on the housing and coupled thereto to prevent relative rotation by a latch or lock which is mounted on the housing and engages a recess in the sheave. Power will normally be transmitted between the housing and the sheave, but to provide protection against overloading in the event of excessive torque being demanded over a period of time, the latch includes a fusible element which will become plastic due to the overload and thus permit free rotation of the housing relative to the sheave.

For a more complete understanding of this invention reference will now be made to the accompanying drawings wherein:

Fig. 1 is a bottom plan view of one embodiment of this invention adapted for rotation about a vertical axis;

Fig. 2 is a sectional view of the embodiment of Fig. 1 taken along the line 2—2 therein;

Fig. 3 is a plan view of the embodiment of Fig. 2 with the bottom plate removed;

Fig. 4 is a partial view of the embodiment as shown in Fig. 1 illustrating the disposition of the parts after experiencing excessive overloading; and Fig. 5 is a partial sectional view taken along the line 5—5 of Fig. 3 illustrating the disposition of the engaging pads in a clutch element.

Referring now to the drawings and more particularly to Fig. 2 a coupling device 10 constructed in accordance with the teaching of this invention is shown mounted on the output shaft 12 of a prime mover 14. The prime mover 14 shown in Fig. 2 is an electric motor and it is believed manifest that any source of energy adapted to produce rotary motion may be employed.

The coupling device 10 comprises an input or driving shaft 16, a plurality of coupling elements 18 contained within a housing 20, an output sheave 22 and a thermally sensitive device 24 connecting the housing 20 to the sheave 22.

The driving shaft 16 is secured to the motor shaft 12 by a set screw 26, thereby preventing relative rotation therebetween. At the free end of shaft 16 a plurality of pins 28 threadably engage the shaft and extend outwardly therefrom in a uniform radial orientation. The manner of positioning the pins 28 on the shaft 16 to form a spider is more clearly shown in Fig. 3. Freely mounted on each of the pins 28 is a clutch element 18 having a generally wedge-like appearance and supporting a plurality of clutch pads 30. The clutch pads may be of any desirable material having the required frictional and wear characteristics, and an impregnated fabric has been found well adapted to this purpose. The pads 30 may be cemented in place in the recesses formed in the elements 18. Each clutch element 18 has a central aperture 32 formed therein which is of slightly larger diameter than the associated pin 28. This permits free radial movement of the clutch element 18 and will thus cause the clutch element to move outwardly under the influence of centrifugal force when the driving shaft 16 is rotated by the prime mover 14.

The housing 20 comprises a body portion 34 and a cover plate 36. The body 34 is rotatably mounted on the shaft 16 and has a fluid-tight bearing 38 disposed between the outer surface of the shaft 16 and the cooperating inner surface of the body 34. A plurality of machine screws 40 disposed about the periphery of the housing secure the cover 36 against the body 34 and an oil-tight seal may be maintained therebetween by the use of an annular gasket 42 if required. Other modes of assembly such as formed sheet metal parts crimped together, or a cover plate threadably engaging the housing may also be employed.

The particular embodiment of this invention shown in the figures of the drawing is adapted for rotation about a vertical axis. However, the invention is to be in no way limited to such a mounting and it should be clear that with minor adaptations a prime mover having a horizontal output shaft may be utilized to drive a clutch constructed in accordance with this invention.

In the embodiment shown, a small well 44 is formed in the center of the cover 36, the outer portion of which has sloping sides 46, the angle of which corresponds to the angular surfaces of the clutch elements 18. This well including the sloping portions of the cover is filled with a lubricating fluid 48. It is believed clear that upon initial rotation of the driving shaft 16 the various parts will contact the lubricant 48 causing it to splash about the housing and lubricate all of the parts. As the clutch elements 18 engage the sloping surface 33 of the body 34 and the corresponding sloping surface 46 of the cover 36, the housing 20 is set in motion, whereby the lubricating fluid 48 is also forced to rotate. The lubricating fluid is thus forced outwardly within the housing by centrifugal action to fill a volume generally defined by the peripheral portion of the body 34 and cover 36 and the dotted line 50 of Fig. 2. Thus, when the housing which comprises the driven element is at high speed the lubricant is completely removed from association with the moving elements and these elements are quickly wiped dry by slight relative rotation between the parts. A firm, positive clutch engagement between the pads 30 and sloping walls of the housing 20 is thus produced whereby the device is completely free of slippage unless a torque substantially in excess of the rated maximum of the device is experienced.

If such excessive torque is experienced for a substantial time, means is provided by this invention to protect the prime mover, the coupling device, and the apparatus being driven. Secured to the body 34 of the housing 20 is a release, latch or lock means comprising a steel pin 52 contained within a sleeve 54 and engaging a recess 56 in the sheave 22. The pin 52 is maintained in engagement within the recess 56 by a fusible plug 58 which is threadably engaged in an enlarged portion 60 of the sleeve 54. The sheave 22 is freely rotatable on the housing 20 in the absence of engagement between the pin 52 and the recess 56. The sheave 22 is rotatably mounted on bearings 62 and 64 which are in turn retained on the body portion 34 of housing 20 by retaining means 66. The retaining means here employed is a split annular snap ring, but it should be clear that any appropriate retainer may be used.

During initial operation of the prime mover there is slippage within the clutch, but little heat is generated because of the lubrication of the parts by the splashing fluid 48. However, once positive engagement is established, an overload on the output sheave 22 will cause slippage between the clutch elements 18 and the housing 20 which will result in the generation of a substantial amount of heat. This heat will quickly be transmitted through the housing 34 and sleeve 54 to the fusible plug 58 and if the slippage continues for a short time the heat generated will be sufficient to render the plug plastic. When such plasticity exists the force of the pin 52 against the plug will either remove the plug from the sleeve or will effect passage of the pin through the plug. There is a continuous force on the pin 52 to the right in Fig. 2 resulting from the sloping surface of the recess 56 engaging the pin 52. The pin 52, sleeve 54, recess 56 and fusible block 58 are clearly shown in their normal positions in Figs. 1 and 2. The partial plan view of Fig. 4 shows the orientation of these parts after an excessive long duration overload has been experienced. It can be seen that the housing 20 has proceded in the direction indicated by arrow 68 and has forced the pin 52 through the fusible plug 58 which is shown deformed and the entire release mechanism 24 has been shifted beyond the point on the sheave 22 at which the recess 56 appears. Thus, to place the apparatus in condition for reuse, the sheave 22 and housing 20 must be relatively rotated to align the pin 52 with recess 56. A new fusible plug 58 may then be inserted in the sleeve 54 whereby the clutch is once again in condition for use. It is believed clear that the device is symmetrically constructed so that it may function bilaterally. Thus the direction of rotation is immaterial to the operation of the apparatus.

The fusible plug 58 may be composed of various alloys to permit release at any predetermined temperature and torque. Various alloys of lead, tin and bismuth have been found especially desirable for this use. Such alloys may, for example, produce release of the sheave at a temperature of 250° F.

While one particular embodiment of this invention has been described in some detail, it is believed clear that various changes and substitutions may be made therein while still utilizing the principals involved, and all such alternate constructions are believed to be within the spirit and scope of this invention. This invention teaches a new device for coupling a source of rotating power to a load, said device being both speed and torque sensitive and providing an overload release when subjected to excessive torques for a predetermined length of time.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A torque sensitive coupling device comprising a rotatable driving means, a coaxial rotatable driven means, friction means connecting said driven and said driving means, output means coaxially mounted relative to said driven means, and thermally sensitive means interconnecting said output means and said driven means in a fixed angular relationship, said thermally sensitive means comprising a pin housing secured to said driven member, pin means received in said pin housing and drivingly engaging a recess in said output means, and a thermally sensitive plug partially filling said pin housing and maintaining said pin in engagement with said output means, said recess being shaped to urge said pin means outwardly therefrom, said driving means and output means being freely rotatable relatively upon removal of said pin from engagement with said output means.

2. A torque sensitive coupling device comprising a rotatable driving means, a coaxial rotatable driven means, centrifugally actuated friction means connecting said driven and said driving means, output means coaxially mounted relative to said driven means, and thermally sensitive means interconnecting said output means and said driven means in a fixed angular relationship, said thermally sensitive means comprising a pin housing secured to said driven member, pin means received in said pin housing and drivingly engaging said output means, said driven means having a depression therein to receive said pin, said depression having angularly disposed side portions whereby said pin is urged outwardly therefrom with a force corresponding to the torque being transmitted, and a thermally sensitive plug partially filling said pin housing and maintaining said pin in engagement with said output means, said driving means and output means being freely rotatable relatively upon removal of said pin from engagement with said output means.

3. A torque sensitive coupling device comprising a rotatable driving means, a coaxial rotatable driven means, centrifugally actuated friction means connecting said driven and said driving means, output means coaxially mounted relative to said driven means, and thermally sensitive means interconnecting said output means and said driven means in a fixed angular relationship, said thermally sensitive means comprising a pin housing secured to said driven member, pin means received in said pin housing and drivingly engaging said output means, said driven means having a depression therein to receive said pin, said depression having angularly disposed side portions whereby said pin is urged outwardly therefrom with a force correspondingly to the torque being transmitted, and a thermally sensitive plug partially filling said pin housing and maintaining said pin in engagement with said output means, said plug becoming plastic for temperatures above a predetermined value, said driving means and output means being freely rotatable relatively upon removal of said pin from engagement with said output means.

4. A torque sensitive coupling device comprising a rotatable driving means, a coaxial driven housing enclosing said driving means, centrifugally actuated friction means carried by and radially movable relative to said driving means, said friction means engaging said driven housing at a predetermined speed, a lubricating fluid partially filling said housing, contacting said friction means for speeds below said predetermined speed and displaced therefrom by centrifugal force for speeds above said predetermined speed, output means coaxially mounted relative to said driven housing, and thermally sensitive means interconnecting said output means and said driven housing in fixed angular relationship, said thermally sensitive means comprising a pin housing secured to said driven housing, pin means receiving in said pin housing and drivingly engaging a recessed portion of said output means, and a thermally sensitive plug partially filling said pin housing and maintaining said pin in engagement with said output means, said recessed portion being shaped to urge said pin means therefrom, said driving means and output means being freely rotatable relatively upon removal of said pin from engagement with said output means.

5. A torque sensitive coupling device comprising a rotatable driving shaft, a coaxial driven housing partially enclosing said shaft and providing a sealed enclosure, said housing having a pair of opposed convergent generally conic surfaces extending outwardly from said shaft, a plurality of clutch weights angularly disposed about said shaft and radially movable relative thereto, said clutch weights having radially convergent surfaces corresponding to the convergent surfaces of said housing whereby centrifugal force effects engagement therebetween for driving shaft speeds above a predetermined minimum, lubricating fluid partially filling said enclosure, output means coaxial relative to said housing, and thermally sensitive means interconnecting said output means comprising a cylindrical sleeve secured to said housing, pin means received in said sleeve and engaging a recessed portion of said output means, and a fusible plug partially filling said sleeve to maintain said pin in engagement with said output means, said output means and said housing being freely rotatable relatively upon removal of said pin from engagement with said output means.

6. A torque sensitive coupling device comprising a rotatable driving shaft, a coaxial driven housing partially enclosing said shaft and providing a sealed enclosure, said housing having a pair of opposed convergent generally conic surfaces extending outwardly from said shaft, a plurality of clutch weights angularly disposed about said shaft and radially movable relative thereto, said clutch weights having radially convergent surfaces corresponding to the convergent surfaces of said housing whereby centrifugal force effects engagement therebetween for driving shaft speeds above a predetermined minimum, lubricating fluid partially filling said enclosure, output means coaxial relative to said housing, and a thermally sensitive means interconnecting said output means and said housing in a fixed angular relationship, said thermally sensitive means comprising a cylindrical sleeve secured to said housing, pin means received in said sleeve and engaging said output means, said output means having a depression therein having sloping sides and adapted to receive said pin, and a fusible plug threadedly engaging said sleeve to maintain said pin in engagement with the depression, said output means and said housing being freely rotatable relatively upon removal of said pin from engagement with said output means.

7. A torque sensitive coupling device comprising a rotatable driving means, a coaxial rotatable driven means, friction means connecting said driving and said driven means to form frictionally coupled elements, third means coaxially mounted relative to said elements, and thermally sensitive means interconnecting said third means and one of said elements in a fixed angular relationship, said thermally sensitive means comprising a pin housing secured to said one of the elements, pin means received in said pin housing and drivingly engaging a recess on said third means, and a thermally sensitive plug partially filling said pin housing and maintaining said pin in engagement with said third means, said recess being shaped to urge said pin means outwardly therefrom, said third means and said one of said elements being freely rotatable relatively upon removal of said pin from said recess.

References Cited in the file of this patent

UNITED STATES PATENTS

| | | |
|---|---|---|
| 1,197,895 | Benol | Sept. 12, 1916 |
| 1,623,862 | Broussouse | Apr. 5, 1927 |
| 1,797,826 | Gage | Mar. 24, 1931 |
| 2,140,723 | Spicer | Dec. 20, 1938 |
| 2,340,415 | Eason | Feb. 1, 1944 |
| 2,423,979 | Jenson | July 15, 1947 |
| 2,663,397 | Scott | Dec. 22, 1953 |

FOREIGN PATENTS

| | | |
|---|---|---|
| 510,000 | Germany | Oct. 15, 1930 |